3,376,057
ONE-PIECE SYNTHETIC RESINOUS BUSHING
Harold S. van Buren, Jr., Cambridge, Mass., assignor to United-Carr Incorporated, Boston, Mass., a corporation of Delaware
Filed Mar. 3, 1966, Ser. No. 531,496
6 Claims. (Cl. 287—52.04)

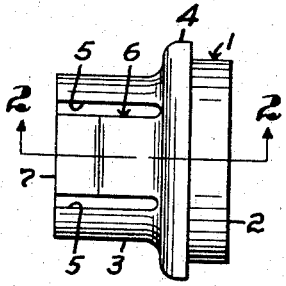
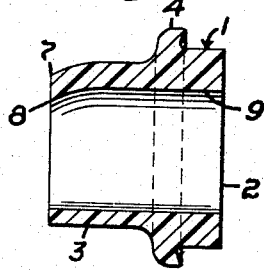
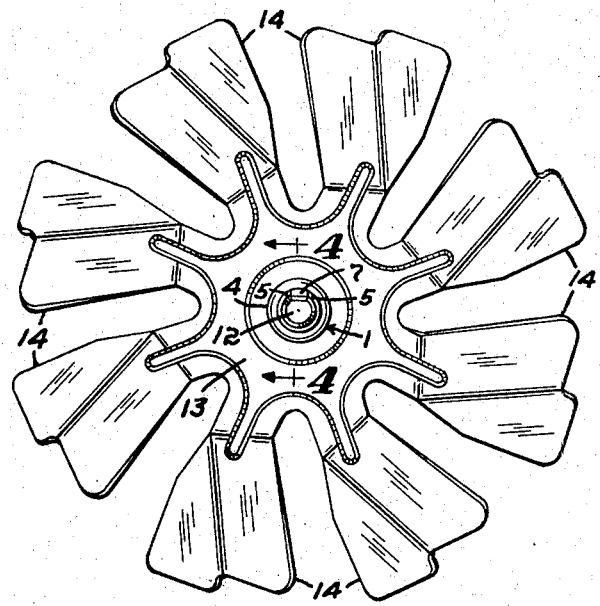
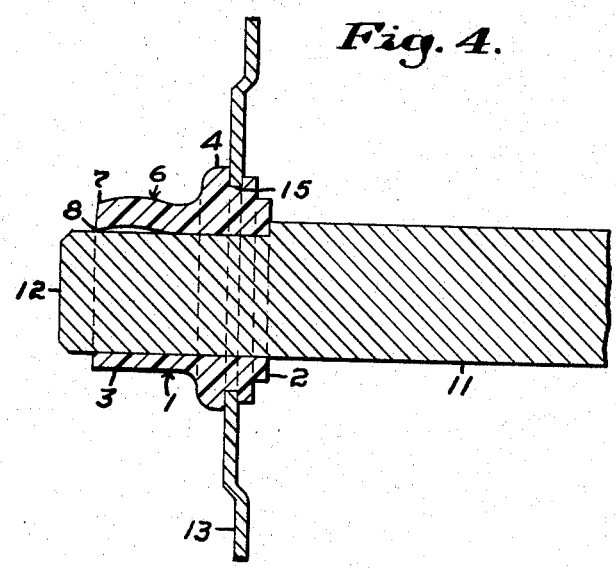
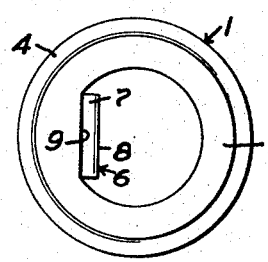
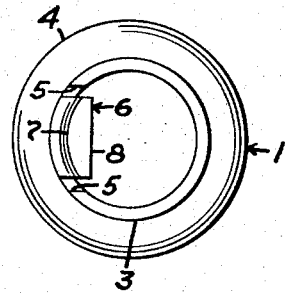
Inventor:
Harold S. vanBuren Jr.
by James R. O'Connor
Atty.

ABSTRACT OF THE DISCLOSURE

A one-piece, molded plastic bushing which is attached to the hub of a fan blade has a spring finger which resiliently engages a rotatable shaft passing through the bushing.

---

The present invention relates generally to bushings and in particular to a one piece, synthetic, resinous bushing for attaching a fan to a rotatable shaft.

An object of the invention is to provide a simple, light, inexpensive and highly efficient bushing for securing a fan blade to a rotatable shaft.

Another object of the invention is to provide a molded, synthetic, resinous bushing having integral, resilient, spring means for engaging a shaft thereby eliminating the need for set screws or other fasteners previously used for said purposes.

Another object of the invention is to provide a bushing which can be quickly installed on a shaft and readily removed therefrom without the utilization of attaching tools.

A still further object of the invention is to provide a bushing which is adapted to be readily attached to the apertured, central disc portion of a fan.

The illustrated embodiment of the invention comprises a tubular base portion, a tubular sleeve extending co-axially from the base portion, the sleeve having a generally circular profile describing an arc in excess of 180° and opposed, free longitudinal edge portions a peripheral, radially extending flange located at the intersection of the sleeve and the base portion, and a spring finger adapted to resiliently engage a shaft. The spring finger is located between the edge portions of the sleeve and forms substantially a continuation of the wall of the sleeve and its free end extends into the area defined by the arc of the sleeve for engagement with a shaft passing through the base portion and the sleeve. The internal surface of the base portion has a flat forming an axial continuation of the undersurface of the spring finger.

Other novel features of the bushing and bushing-fan combination will become evident from a reading of the following detailed description in conjunction with a viewing of the accompanying drawings in which:

FIG. 1 is a side elevation of the bushing;
FIG. 2 is a section taken on line 2—2 of FIG. 1;
FIG. 3 is an end view of an installation depicting the bushing securing a fan to a rotatable D-shaped shaft;
FIG. 4 is a section taken on line 4—4 of FIG. 3;
FIG. 5 is an end view of the bushing as seen from the right of FIG. 1; and
FIG. 6 is an end view of the bushing as seen from the left of FIG. 1.

The bushing 1 is of unitary, molded, synthetic, resinous construction, for example, the acetal resin marketed by Du Pont under the trade name 'Delrin" and includes a generally tubular base portion 2, an elongated tubular sleeve 3 extending co-axially from the base 2 and a peripheral flange 4 extending from the bushing at the intersection of the base 2 and the sleeve 3. The base 2 is appreciably thicker in cross section than the sleeve 3. The sleeve has a generally circular profile describing an arc in excess of 180° and has a pair of opposed, longitudinal free edges 5 extending from the flange 4 to the free end of the sleeve. A flexible spring finger 6 extends from the base 2 and forward side of the flange 4 between the edges 5 and terminates in a free end 7 adjacent the forward or free end of the sleeve 3. Thus the finger 6 substantially forms a continuation of the wall of the sleeve 3.

The free end 7 of the spring finger is bowed as viewed in elevation and presents a sharp leading edge 8 which extends downwardly into the opening defined by the sleeve 3. As best seen in FIGS. 2 and 5 the undersurface of the finger 6 adjacent the flange 4 is generally flat and the inner wall of the base 2 has a flat portion 9 formed as an axial continuation of the flat portion of the spring finger.

FIGS. 3 and 4 depict an installation wherein the bushing 1 is utilized to secure a fan 10 to a rotatable shaft 11 having a D-shaped forward end 12. The fan 10 has a central disc portion 13 and a plurality of blades 14 extending readily outwardly from the periphery of the disc 13. The disc is provided with a central aperture 15 to receive the bushing 1.

The attachment of the bushing to the fan is accomplished by passing the base 2 through the aperture 15 until the flange 4 abuts the forward surface of the disc 13 adjacent the aperture. Portions of the rear end of the base 2 are then swedged up against the rear surface of the disc, as best seen in FIG. 4, to securely attach the bushing to the fan.

Thereafter to couple the fan to the shaft one need only manually push the bushing on to the D-shaped end 12 such that the flat portion 9 of the base 2 and the flat portion of the finger 6 overlie and tightly abut the flat surface on the shaft. As seen in FIG. 4 the spring finger 6 is flexed upwardly and placed in tension and its free end 7 bears tightly against the shaft. Since the internal diameter of the base 2 and sleeve 3 is approximately equal to that of the shaft end 12, the bushing tightly grips the shaft throughout its circumference. The reader will also appreciate that in the milling of a shaft to form a flat thereon small ridges and grooves which traverse the shaft are formed by the milling tool. Thus the frictional bearing of the sharp edge 8 on the finger 6 against the rough surface created by such ridges and grooves tend to prohibit any lateral movement of the bushing along the shaft during rotation of the latter.

In considering the merits of the present invention, one should be aware that the prior art devices it was designed to replace are generally characterized by a heavy machined metal bushing having a set screw which is turned down against the shaft once the two are coupled. Looking at its most practical aspect the present invention can be produced at about one fifth of the cost of the prior art bushing described above. In addition the turning down of the set screw is time-consuming in mass production operations, and in instances where the screw is not properly aligned with the flat portion of the shaft, the bushing tends to work loose when subjected to the vibrations set up by the rotating fan. Further the ease with which the present bushing may be removed from a shaft as compared with the machined metal set screw version is obvious.

When one considers these economic advantages in conjunction with the fact that the invention has been tested to the extent of operating a 9" fan continuously for 30 days at 1550 r.p.m. without any slippage of the bushing whatsoever, the improvement over the prior art becomes readily apparent.

Moreover while one form of the novel bushing has been described for purposes of illustration, it is to be clearly understood that the description is not to be inter-

I claim:

1. A one piece synthetic, resinous bushing for securing a part attached thereto to a rotatable shaft comprising a hollow, tubular base portion, a hollow, tubular sleeve extending outwardly from said base portion coaxially therewith, said sleeve having a generally circular profile describing an arc greater than 180° and opposed, free longitudinal edge portions, a peripheral part-engaging flange extending outwardly from said bushing at the intersection of said base portion and said sleeve, and a spring finger adapted to resiliently engage a shaft extending from one side of said flange toward the end of said sleeve remote from said flange, said finger being located between the free, longitudinal edges of said sleeve so as to form substantially a continuation of the wall of said sleeve, and said finger having a free edge extending into the area defined by the arc of said sleeve for engagement with a shaft passing through said sleeve, the internal surface of said base having a flat portion forming an axial continuation of the undersurface of said spring finger.

2. A one-piece synthetic resinous bushing according to to claim 1 wherein said base portion is appreciably thicker in cross section than said sleeve.

3. A one-piece synthetic, resinous bushing according to claim 1 wherein the free end of said spring finger presents an arced profile in elevation.

4. An installation comprising in combination a rotatable shaft having a D-shaped end portion, a part having a central, apertured disc portion, and a one piece synthetic, resinous bushing attached to said disc and securing said part to the D-shaped end of said shaft, said bushing having a hollow, generally tubular base portion, a hollow, tubular sleeve extending from said base portion co-axially therewith, said sleeve having a circular profile describing an arc greater than 180°, and opposed, free, longitudinal edge portions, a peripheral flange extending outwardly from said base at the intersection of said base and said sleeve and a spring finger extending from one side of said flange toward the end of said sleeve remote from said flange, said finger being located between the free edge portions of said sleeve, said base portion being seated in the aperture in said disc such that said flange abuts one side of said disc, portions of said base having been upset to overlie the surface of said disc remote from said flange to securely attach the part to the bushing, said bushing being seated on the D-shaped end of said shaft such that said base portion and said sleeve surround the arcuate portions of said end and said spring finger is in flexed, tensioned engagement with the flat portion of said D-shaped shaft end.

5. An installation according to claim 4 wherein said spring finger has a sharp edge at its free end and said edge is in bighting engagement with the flat surface of said D-shaped shaft.

6. An installation according to claim 4 wherein portions of said spring finger are bowed upwardly so as to be spaced from said shaft.

References Cited

UNITED STATES PATENTS

| | | | |
|---|---|---|---|
| 1,409,758 | 3/1922 | Nichols | 287—52.07 |
| 2,244,975 | 6/1941 | Tinnerman | 287—534 |
| 2,322,947 | 6/1943 | Litwin et al. | 287—126 |
| 2,421,254 | 5/1947 | Froelich | 287—53 |
| 3,264,016 | 8/1966 | Reisch | 287—53 |

CARL W. TOMLIN, *Primary Examiner.*

A. KUNDRAT, *Assistant Examiner.*